US010737722B2

(12) United States Patent
Yang

(10) Patent No.: US 10,737,722 B2
(45) Date of Patent: Aug. 11, 2020

(54) ELECTRIC POWER STEERING SYSTEM

(71) Applicant: STEERING SOLUTIONS IP HOLDING CORPORATION, Saginaw, MI (US)

(72) Inventor: Kun Yang, Suzhou (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 252 days.

(21) Appl. No.: 15/820,711

(22) Filed: Nov. 22, 2017

(65) Prior Publication Data

US 2018/0141587 A1 May 24, 2018

(30) Foreign Application Priority Data

Nov. 23, 2016 (CN) .......................... 2016 1 1036887

(51) Int. Cl.
*B62D 15/02* (2006.01)
*B62D 1/16* (2006.01)
*B62D 3/12* (2006.01)
*B62D 5/04* (2006.01)
*B62D 6/10* (2006.01)

(52) U.S. Cl.
CPC ............. *B62D 15/024* (2013.01); *B62D 1/16* (2013.01); *B62D 3/12* (2013.01); *B62D 5/0463* (2013.01); *B62D 6/10* (2013.01)

(58) Field of Classification Search
CPC combination set(s) only.
See application file for complete search history.

(56) References Cited

U.S. PATENT DOCUMENTS

| 8,938,334 B2* | 1/2015 | Wei ....................... B62D 15/024 701/41 |
| 2002/0111763 A1* | 8/2002 | Koga ................... B62D 15/021 702/151 |
| 2011/0190984 A1* | 8/2011 | Reeve .................. B62D 5/0457 701/41 |
| 2011/0301815 A1* | 12/2011 | Koukes ................. B60T 8/1755 701/42 |

(Continued)

FOREIGN PATENT DOCUMENTS

| CN | 1907786 A | 2/2007 |
| CN | 102991573 A | 3/2013 |

(Continued)

*Primary Examiner* — Rami Khatib
(74) *Attorney, Agent, or Firm* — Dickinson Wright PLLC

(57) ABSTRACT

An electric power steering system includes a mechanical linkage, first and second wheels, an electric motor, first and second speed sensors, and an electronic control unit. The linkage includes a steering column and a rack operatively engaged to the steering column. The first and second wheels are rotationally engaged to opposite ends of the rack. The motor is operatively attached to the linkage for providing steering assistance. The first and second speed sensors are configured to detect rotation speed of the respective first and second wheels. The unit is configured to receive first and second rotational speed signals from the respective first and second speed sensors, and calculate a first rotational speed differential between the first and second wheels to facilitate an estimation of a steering column angular position for controlling the electric motor.

14 Claims, 5 Drawing Sheets

(56) References Cited

U.S. PATENT DOCUMENTS

| | | | |
|---|---|---|---|
| 2012/0271513 A1* | 10/2012 | Yoneda | B62D 5/0484 |
| | | | 701/41 |
| 2013/0024072 A1* | 1/2013 | Michelis | B62D 15/0235 |
| | | | 701/42 |
| 2015/0151784 A1* | 6/2015 | Moretti | B62D 15/024 |
| | | | 701/41 |
| 2015/0158496 A1* | 6/2015 | Cassar | B60W 40/10 |
| | | | 702/150 |
| 2019/0077447 A1* | 3/2019 | Kim | B62D 6/008 |

FOREIGN PATENT DOCUMENTS

| | | | |
|---|---|---|---|
| CN | 103158763 A | 6/2013 | |
| EP | 2055613 B1 | 10/2011 | |
| JP | 2012236585 A | 12/2012 | |

* cited by examiner

ELECTRIC POWER STEERING SYSTEM

CROSS-REFERENCES TO RELATED APPLICATIONS

This patent application claims priority to Chinese Patent Application Serial No. 201611036887.5, filed Nov. 23, 2016 which is incorporated herein by reference in its entirety.

BACKGROUND OF THE INVENTION

The present disclosure relates to vehicle steering systems, and more particularly to electric power steering systems.

Power steering systems, such as electric power steering (EPS), electric power assisted steering (EPAS), and motor-driven power steering (MDPS), utilize an electric motor, a torque sensor, and a steering wheel position sensor to assist an operator to maneuver a vehicle. Generally, the electric motor, the torque sensor and the steering wheel position sensor may be mounted to a steering column. The electric motor may drive a reduction gear operably coupled to the steering column to assist in column rotation.

When the operator applies a torque to the steering wheel, the torque sensor measure this torque and sends a torque signal to an electronic control unit (ECU). Similarly, the steering wheel position sensor detects the angular position of the steering wheel and sends a position signal to the ECU. The ECU applies the torque signal and the position signal along with other vehicle information, such as vehicle speed and the rate of steering wheel rotation, to calculate a desired steering assist power and send an associated command signal to the electric motor. The steering assist capability of the power steering system may include a feature that provides an active return assist that is associated with returning the steering wheel to a center position (i.e., after vehicle turn completion) based on a variety of sensory inputs to the ECU. Unfortunately, the various sensors required to provide steering assist capability, contribute toward design complexity, cost, and the weight of the vehicle.

Accordingly, it is desirable to provide a power steering system that may reduce the number of required sensors and/or components, may be more robust, may be simpler in design, and may be less costly.

SUMMARY OF THE INVENTION

In one exemplary embodiment of the present disclosure, an electric power steering system includes a mechanical linkage, first and second wheels, an electric motor, first and second speed sensors, and an electronic control unit. The linkage includes a steering column and a rack operatively engaged to the steering column. The first and second wheels are rotationally engaged to opposite ends of the rack. The motor is operatively attached to the linkage for providing steering assistance. The first and second speed sensors are configured to detect rotation speed of the respective first and second wheels. The unit is configured to receive first and second rotational speed signals from the respective first and second speed sensors, and calculate a first rotational speed differential between the first and second wheels to facilitate an estimation of a steering column angular position for controlling the electric motor.

In another exemplary embodiment, a computer program product for an electric power steering system of a vehicle includes an electric motor, and is configured to enable a steering wheel return assist feature. The computer program product includes a wheel deviation module and a steering wheel position module. The wheel deviation module is configured to receive first and second wheel rotational speed signals and output a wheel deviation. The steering wheel position module is configured to receive the wheel deviation, apply preprogrammed data tables, and output an estimation of a steering wheel position.

In another exemplary embodiment, a method of operating an electric power steering system includes a step of measuring first and second rotational speeds of respective first and second wheels mounted to a common axle. The method then determines the difference between the first and second rotational speeds, and from that difference, determines an estimation of a steering column angular position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
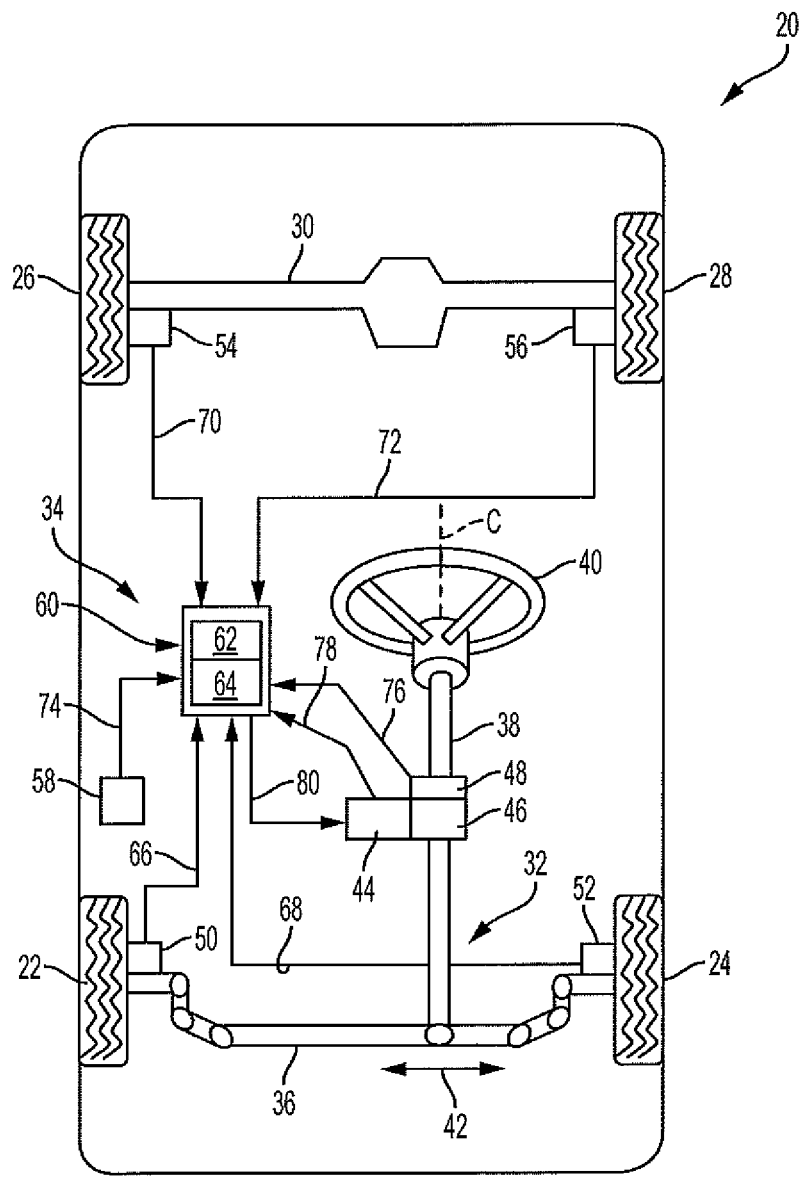
FIG. 1 is a schematic of a vehicle incorporating an electric power steering system as one, non-limiting, exemplary embodiment of the present disclosure.

Referring now to the Figures, where the invention will be described with reference to specific embodiments, without limiting same, a vehicle 20 is illustrated in FIG. 1. The vehicle 20 may include two front wheels 22, 24, two rear wheels 26, 28, a rear axle 30, a mechanical steering linkage 32, and an electric power steering system 34. The rear wheels 26, 28 are engaged for rotation to respective, opposite, ends of the rear axle 30. The mechanical steering linkage 32 may include a rack 36, a steering column 38, and a steering wheel 40 connected to a distal end of the steering column 38. The front wheels 22, 24 are engaged to respective, opposite, ends of the rack 36. The steering column 38 is operably engaged to the rack 36, and rotates about a centerline C when the steering wheel 40 is rotated by an operator. Rotation of the steering column 38 generally causes linear motion (see arrow 42) of the rack 36. The linear motion 42 of the rack 36 may cause the rack to generally push and pull upon the wheels 22, 24, thereby turning or directing the wheels in an angular direction desired by the operator.

The electric power steering system 34 may include an electric motor 44, a reduction gear 46, a torque sensor 48, wheel speed sensors 50, 52, 54, 56 associated with respective wheels 22, 24, 26, 28, a vehicle velocity sensor 58, and an electronic control unit (ECU) 60. The ECU 60 may include a processor (e.g., microprocessor) 62 and a computer writeable and readable storage medium 64. In one embodiment, the electric motor 44 may be a brush motor. It is noted, that those skilled in the art of motors know that brush motors may not realize position by dynamic learning or lock-to-lock maneuvers. Therefore, more traditional electric power steering systems that utilize brush motors may also utilize a steering angle sensor to at least provide an active steering wheel return feature.

As illustrated in FIG. 1, the reduction gear 46 may be operably coupled to the rotating steering column 38 of the mechanical steering linkage 32, and the electric motor 44 may be adapted to drive the reduction gear 46. In another embodiment, the electric motor 44 may be operably coupled to the rack 36 of the mechanical steering linkage 32, and directly facilitates or assists in the push/pull of the rack 36 along linear motion or direction 42.

The ECU 60 may be configured to receive rotational speed signals 66, 68, 70, 72 from the respective wheel speed sensors 50, 52, 54, 56 indicative of the respective rotational speed of the wheels 22, 24, 26, 28. The ECU 60 may also be configured to receive a vehicle velocity signal 74 from the vehicle velocity sensor 58, a torque signal 76 from the torque sensor 48 indicative of the torque applied to the steering wheel 40 by the operator, and a motor velocity signal 78 from the electric motor 44. Any number of the signals 66, 68, 70, 72, 74, 76, 78 may be sent over wired pathways (e.g., bus), or wireless pathways. It is contemplated and understood that some or all of the sensors 50, 52, 54, 56, 58 may be associated with other vehicle systems such as an anti-lock braking system (ABS), an electronic stability control (ESC) system, and/or others. Therefore, the sensors and other components used as part of the electric power steering system 34 may have dual functions or services.

Figure 2:
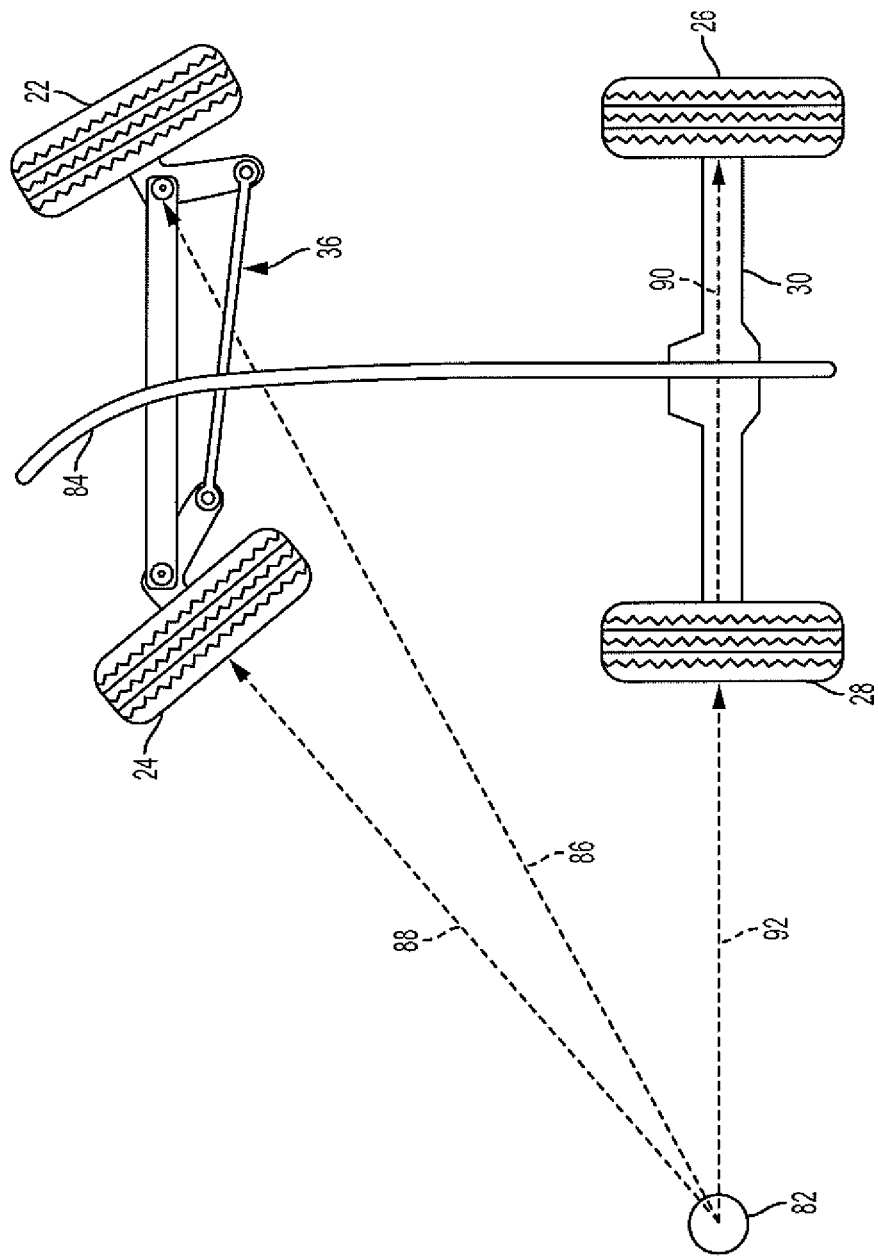
FIG. 2 is a plan view of a turning radius of the vehicle.

Referring to FIGS. 1 and 2, the ECU 60 may be programmed with a variety of algorithms and data tables for the processing of the incoming signals 66, 68, 70, 72, 74, 76, 78 to output a command signal 80 to the electric motor 44. The command signal 80 is associated with a desired force or torque imparted by the motor 44 that assists the driver when entering a turn and assists the driver in terms of returning the steering wheel 40 to a center position when generally completing the turn. To calculate the command signal 80, more traditional systems required data from a steering column position sensor, and particularly for applications utilizing a brush motor. In the present disclosure, there may not be a steering column position sensor. Instead, the steering column angular position is calculated or estimated by wheel speed differentials or deviations.

More specifically, in any instance during a vehicle turn scenario, the inner front and rear wheels 24, 28 (i.e., as illustrated in FIG. 2) and the outer front and rear wheels 22, 26 are moving about a center point 82 (i.e., center of turning circle) associated with a vehicle turning centerline 84. For example, the front wheels 22, 24 are associated with respective turning radii 86, 88 (i.e., distances from the center point 82 for each respective wheel 22, 24) with radius 86 being longer than radius 88. The outer front wheel 22 with the longer radius 86 must therefore spin or turn at a faster speed than the inner front wheel 22 associated with the shorter radius 88. Similarly, the rear wheels 26, 28 are associated with respective turning radii 90, 92 with radius 90 being longer than radius 92. The outer rear wheel 26 with the longer radius 90 must therefore spin or turn at a faster speed than the inner rear wheel 28 associated with the shorter radius 92. The difference between the rotational wheel speeds of the front wheels 22, 24 may be directly associated with the angular position of the steering column 38. Similarly, the difference between the rotational wheel speeds of the rear wheels 26, 28 may also be directly associated with the angular position of the steering column 38.

Figure 3:
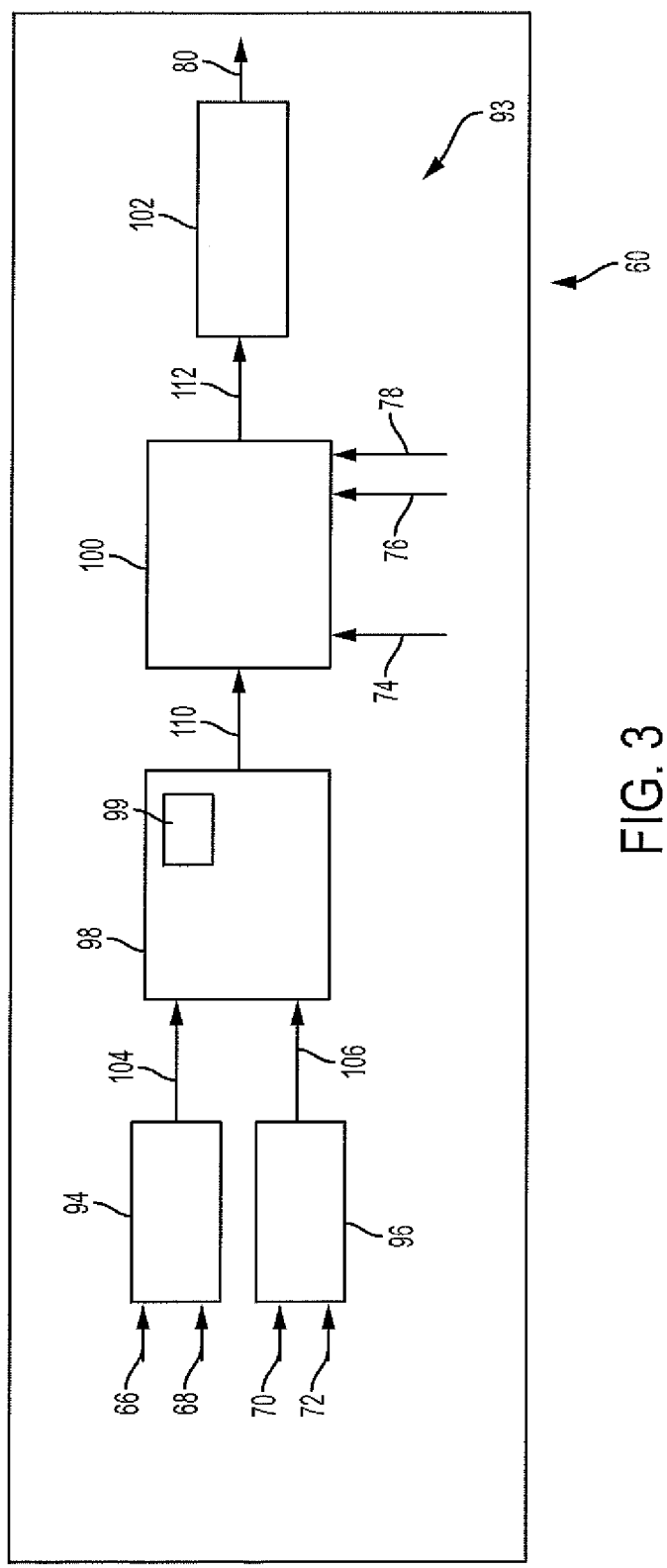
FIG. 3 is a block diagram of a return assist feature of the electric power steering system, and embodied in an electronic control module.

Referring to FIG. 3, the ECU 60 may include a return assist feature 93 that has a front wheel deviation module 94, a rear wheel deviation module 96, a steering wheel position module 98, an arbitration module 100, and a return torque module 102. The front wheel deviation module 94 is configured to receive the front wheel rotational speed signals 66, 68 associated with the respective front wheels 22, 24, process the signals, and output a front wheel deviation 104. The front wheel deviation 104 is sent to the steering wheel position module 98. Similarly, the rear wheel deviation module 96 is configured to receive the rear wheel rotational speed signals 70, 72 associated with the respective rear wheels 26, 28, process the signals, and output a rear wheel deviation 106. The rear wheel deviation 106 is sent to the steering wheel position module 98.

The steering wheel position module 98 receives the front and rear wheel deviations 104, 106, and through programmed algorithm(s), logic, and data table(s) 99, calculates and outputs an estimated steering wheel position 110. In one embodiment, the steering wheel position module 98 may utilize the front wheel deviation 104 to calculate the estimated steering wheel position 110, and use the rear wheel deviation 106 to verify the front wheel deviation 104 for accuracy. In another embodiment, the steering wheel position module 98 may generally average the front and rear wheel deviations 104, 106 together to get an average deviation that is then used to calculate the estimated steering wheel position 110. The data tables 99 may be associated with a vehicle model and/or associated with physical attributes of a particular vehicle model or type.

The arbitration module 100 is configured to receive the estimation of the steering wheel position 110 along with the vehicle velocity signal 74, the torque signal 76, and the motor velocity signal 78. The arbitration module 100 may then apply various preprogrammed data table(s), logic, and algorithm(s) that use the steering wheel position 110, the vehicle velocity signal 74, and the torque signal 76 to calculate and output a return torque 112. The return torque module 102 is configured to receive the return torque 112 and equate the appropriate command signal 80. The arbitration module 100 may output a return torque 112 (or the motor 44 may assign a return torque) until one or both of the wheel speed deviations 104, 106 is less than a pre-programmed threshold, or the estimated steering wheel position 110 is below a pre-programmed threshold. It is contemplated and understood that a similar process may be applied, or the same feature 93 may be used, to calculate any torque of force command signal to be received by the motor 44 to assist an operator in maneuvering the vehicle 20.

Figure 4:
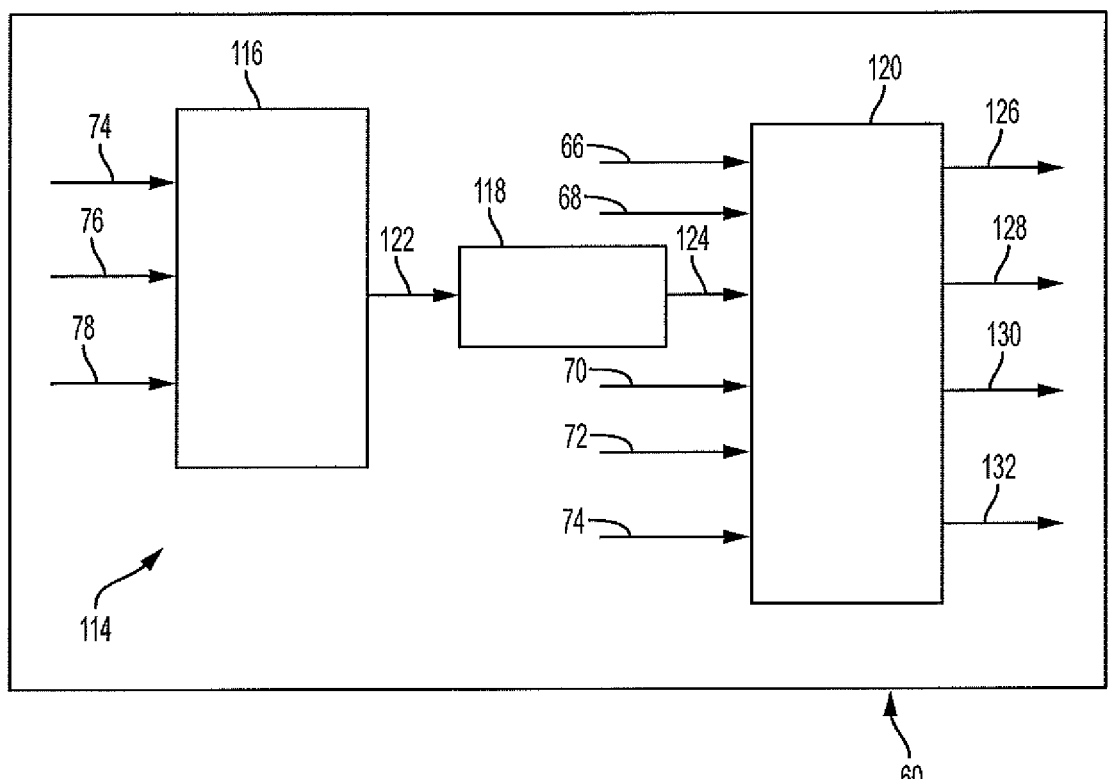
FIG. 4 is a block diagram of a wheel circumference compensator feature of the electric power steering system, and embodied in the electronic control module.

Referring to FIG. 4, the ECU 60 may further include a wheel circumference compensator feature 114 that compensates for any differences in wheel circumference between the front wheels 22, 24, and between the rear wheels 26, 28. Such differences in circumference, if not compensated for, may undesirably impact the return assist feature 93 of the ECU 60. It is contemplated and understood that differences in wheel circumference may be caused by differences in tire pressure, or other physical and/or dynamic factors.

The wheel circumference compensator feature 114 is generally configured to determine wheel circumference differences when the vehicle 20 is moving or driving substantially straight. The feature 114 may perform wheel circumference checks at prescribed intervals in time, and may include a dynamic verification module 116, a dynamic enable module 118, and a wheel circumference comparison module 120. The dynamic verification module 116 is configured to receive the vehicle velocity signal 74, the torque signal 76, and the motor velocity signal 78 to determine if the vehicle 20 is generally driving straight before performing the determination of wheel circumference differences. For example, if the vehicle 20 is moving as determined by the vehicle velocity signal 74, the torque signal 76 is relatively low or zero indicating the operator is driving substantially straight, and the velocity of the electric motor 44 is substantially zero indicating no torque assist is required, the dynamic verification module 116 may determine or verify that the vehicle is moving in a generally straight line or direction. With this confirmation of motion in a substantially straight line, the dynamic verification module 116 may output an enablement result 122 to the dynamic enable module 118 that, in-turn, forwards an initiation 124 to the wheel circumference comparison module 120.

The wheel circumference comparison module 120 of the wheel circumference compensator feature 114 may be configured to receive and process the rotational speed signals 66, 68, 70, 72 from the respective wheel speed sensors 50, 52, 54, 56 and the vehicle velocity signal 74 from the vehicle velocity sensor 58. The wheel circumference comparison module 120 may apply preprogrammed algorithm(s), data table(s), and logic to determine the rotational speed difference between the front wheel 22, 24, and between the rear wheels 26, 28. If there is no rotational speed difference, this is indicative of the front wheels 22, 24 being of the same circumference, and a similar logic applies to the rear wheels 26, 28. If there are differences, each wheel is assigned a circumference compensator (i.e., value). The module 120 may then output the circumference compensators 126, 128, 130, 132 respectively associated with the wheels 22, 24, 26, 28 when the vehicle 20 is moving straight.

Figure 5:
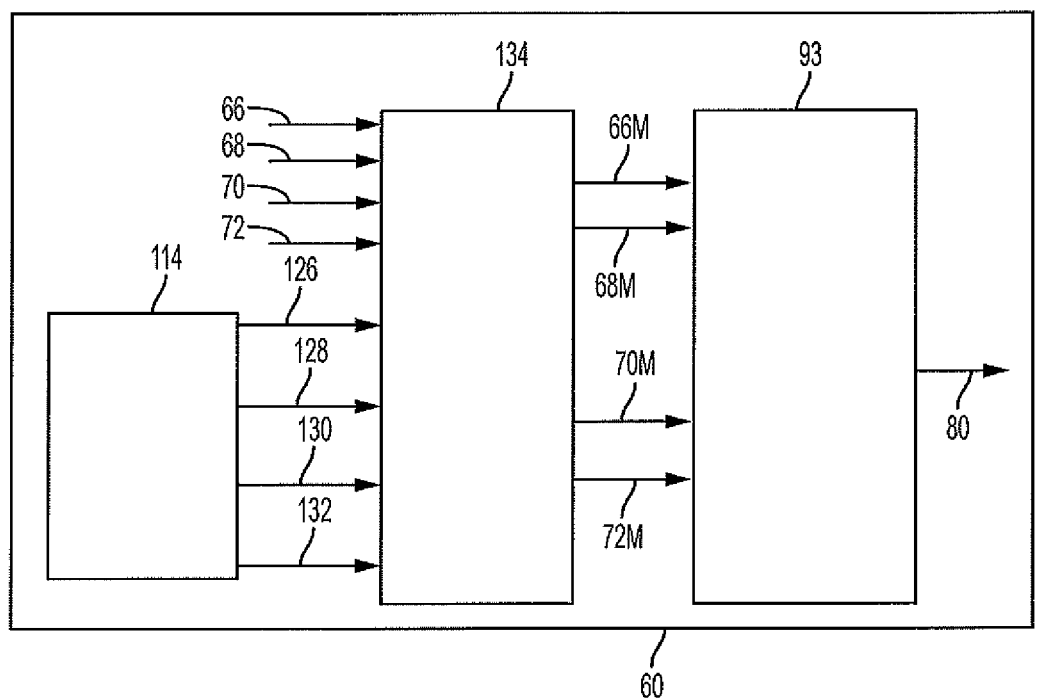
FIG. 5 is a block diagram of a portion of the electric power steering system embodied in the electronic control module and including the return assist feature and the wheel circumference compensator feature.

Referring to FIG. 5 and generally located between the wheel circumference compensator feature 114 and the return assist feature 93 may be a wheel speed correlation module 134 of the ECU 60. The correlation module 134 is configured to receive the latest circumference compensators 126, 128, 130, 132 calculated when the vehicle was moving straight and stored in the storage medium 64 of the ECU 60, and receive the rotational speed signals 66, 68, 70, 72 from the respective wheel speed sensors 50, 52, 54, 56 indicative of the rotational speeds of the respective wheels 22, 24, 26, 28. The wheel speed correlation module 134 may then correlate the circumference compensators 126, 128, 130, 132 with the respective rotational speed signals 66, 68, 70, 72 and output respective, modified or corrected, rotational speed signals or values 66M, 68M, 70M, 72M to the associated front and rear wheel deviation modules 94, 96 (see FIG. 3) of the return assist feature 93.

As used herein, the terms ECU and/or controller refer to processing circuitry that may include an application specific integrated circuit (ASIC), an electronic circuit, a processor (shared, dedicated, or group) and memory. The terms feature and/or module, as used herein, may refer to software, computer readable program instructions firmware programs, stored data and other components that may be executed or read by the processor. The program instructions may be assembler instructions, instruction-set-architecture (ISA) instructions, machine instructions, machine dependent instructions, microcode, firmware instructions, state-setting data, or either source code or object code written in any combination of one or more programming languages.

The electric power steering system 34 may, at least in-part, be a computer program product that includes the computer readable storage medium 64 (or media) having computer readable program instructions thereon for causing the processor 62 of the ECU 60 to carry out aspects of embodiments herein.

The computer readable storage medium 64 may be a tangible device that may retain and store the computer readable program instructions for use by an instruction execution device (e.g., the processor 62). The computer readable storage medium 64 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric power steering system comprising:
a mechanical linkage including a steering column and a rack operatively engaged to the steering column;
first and second wheels rotationally engaged to opposite ends of the rack;
an electric motor operatively attached to the mechanical linkage for providing steering assistance;
a first speed sensor configured to detect rotational speed of the first wheel;
a second speed sensor configured to detect rotational speed of the second wheel; and
an electronic control unit configured to:
receive first and second rotational speed signals from the respective first and second speed sensors, and calculate a first rotational speed differential between the first and second wheels to calculate an estimation of a steering column angular position for controlling the electric motor; and
apply a vehicle velocity signal, a torque signal, and a motor velocity signal to determine if the vehicle is moving straight; and if the vehicle is moving straight, then applying at least the first rotational speed signal, the second rotational speed signal, and the vehicle velocity signal to determine a first wheel circumference compensator of the first wheel and a second wheel circumference compensator of the second wheel to calculate the first rotational speed differential.

2. The electric power steering system set forth in claim 1 further comprising:

an axle generally spaced from and disposed parallel to the rack;

third and fourth wheels rotationally engaged to opposite ends of the axle;

a third speed sensor configured to detect rotational speed of the third wheel; and a fourth speed sensor configured to detect rotational speed of the fourth wheel, and wherein the electronic control unit is configured to receive third and fourth rotational speed signals from the respective third and fourth speed sensors, calculate a second rotational speed differential between the third and fourth wheels, and utilize the second rotational speed differential to calculate the estimation of the steering column angular position.

3. The electric power steering system set forth in claim 1 further comprising:

a torque sensor configured to measure torque applied to the steering column by an operator and output the torque signal to the electronic control unit, wherein the electronic control unit applies the torque signal and the estimation of the steering column angular position to control the electric motor.

4. The electric power steering system set forth in claim 3 further comprising:

a vehicle velocity sensor configured to measure vehicle velocity and output the vehicle velocity signal to the electronic control unit, wherein the electronic control unit applies the vehicle velocity signal to control the electric motor.

5. The electric power steering system set forth in claim 4 further comprising:

a motor velocity sensor configured to measure the operating velocity of the electric motor and output the motor velocity signal to the electronic control unit, wherein the electronic control unit applies the motor velocity signal to control the electric motor.

6. The electric power steering system set forth in claim 5, wherein the steering assistance provided by the electric motor is a return torque assistance.

7. The electric power steering system set forth in claim 6, wherein the electric motor is a brush motor.

8. The electric power steering system set forth in claim 1, wherein the electric motor is a brush motor, and the steering assistance provided by the electric motor is a return torque assistance.

9. The electric power steering system set forth in claim 1, wherein the electronic control unit is configured to apply the third rotational speed signal and the fourth rotational speed signal to determine a third wheel circumference compensator of the third wheel and a fourth wheel circumference compensator of the fourth wheel to calculate the second rotation speed differential.

10. An apparatus for an electric power steering system of a vehicle including an electric motor and configured to enable a steering wheel return assist feature, the apparatus comprising:

a processor; and a memory including instructions that, when executed by the processor, cause the processor to:

receive first and second wheel rotational speed signals and output a wheel deviation;

receive the wheel deviation, apply preprogrammed data tables, and output an estimation of a steering wheel position;

apply a vehicle velocity signal, a torque signal, and a motor velocity signal to determine if the vehicle is moving straight; and if the vehicle is moving straight, then applying at least the first rotational speed signal, the second rotational speed signal, and the vehicle velocity signal to determine a first wheel circumference compensator of a first wheel and a second wheel circumference compensator of a second wheel to calculate the first rotational speed differential.

11. The apparatus set forth in claim 10, wherein the instructions further cause the processor to:

receive the estimation of the steering wheel position, the vehicle velocity signal, the torque signal indicative of an operator applied torque to a steering wheel, and the motor velocity signal associated with the electric motor; and receive a return torque and output a command signal to the electric motor.

12. The apparatus set forth in claim 10, wherein the instructions further cause the processor to:

receive the first and second wheel rotational speed signals and the first and second circumference compensators and output corrected first and second wheel rotational speed signals.

13. A method of operating an electric power steering system comprising:

measuring, using one or more sensors, first and second rotational speeds of respective first and second wheels mounted to a common axle of a vehicle;

determining, using a processor in communication with the one or more sensors, the difference between the first and second rotational speeds; and determining an estimation of a steering column angular position via the difference; and applying a vehicle velocity signal, a torque signal, and a motor velocity signal to determine if the vehicle is moving straight; and if the vehicle is moving straight, then applying at least the first rotational speed signal, the second rotational speed signal, and the vehicle velocity signal to determine a first wheel circumference compensator of the first wheel and the second wheel circumference compensator of a second wheel to calculate the first rotational speed differential.

14. The method set forth in claim 13, wherein the determination of the estimation of the steering column angular position includes processing of the vehicle speed signal, the torque signal indicative of the torque applied by an operator, and the motor velocity signal of an electric motor of the electric power steering system.

\* \* \* \* \*